(12) United States Patent
Okamoto et al.

(10) Patent No.: US 8,905,591 B2
(45) Date of Patent: Dec. 9, 2014

(54) LINEAR LIGHT SOURCE APPARATUS

(75) Inventors: Masashi Okamoto, Hyogo (JP); Koji Oda, Hyogo (JP); Shinichiro Kanaoka, Hyogo (JP); Motonori Tada, Hyogo (JP); Koichi Kamei, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 289 days.

(21) Appl. No.: 13/592,985

(22) Filed: Aug. 23, 2012

(65) Prior Publication Data

US 2013/0051027 A1    Feb. 28, 2013

(30) Foreign Application Priority Data

Aug. 23, 2011 (JP) .................................. 2011-181458
May 16, 2012 (JP) .................................. 2012-112172

(51) Int. Cl.
 *F21V 29/00* (2006.01)
 *F21V 8/00* (2006.01)
 *H04N 1/028* (2006.01)
 *H04N 1/00* (2006.01)

(52) U.S. Cl.
 CPC ......... *H04N 1/0083* (2013.01); *H04N 1/02835* (2013.01); *H04N 1/00989* (2013.01)
 USPC ........................ 362/294; 362/555; 362/249.02

(58) Field of Classification Search
 USPC ...................... 362/555, 580, 218, 249.02, 294
 See application file for complete search history.

(56) References Cited

U.S. PATENT DOCUMENTS

| 7,993,046 | B2* | 8/2011 | Wang et al. ..................... 362/555 |
| 2011/0242830 | A1* | 10/2011 | Okui et al. ..................... 362/511 |

FOREIGN PATENT DOCUMENTS

| JP | 2006-269140 A | 10/2006 |
| JP | 2010-092780 A | 4/2010 |

\* cited by examiner

*Primary Examiner* — David V Bruce
(74) *Attorney, Agent, or Firm* — Rader, Fishman & Grauer PLLC

(57) ABSTRACT

A linear light source includes an LED, an LED drive circuit substrate disposed on a frame, a flexible substrate on which an electric supply pattern is formed and to which the LED is attached at one end and the LED drive circuit is attached at the other end, a linear light guide and a heat sink. The one end of the flexible substrate is attached to the heat sink. A face of the heat sink covered by the LED and a face of the one end of the flexible substrate are perpendicular to the light guide and to a substrate face of the LED drive circuit substrate, while a face of the other end of the flexible substrate is parallel to the light guide and a substrate face of the LED drive circuit substrate. A bent portion is formed between the two ends of the flexible substrate.

10 Claims, 10 Drawing Sheets

LINEAR LIGHT SOURCE APPARATUS

CROSS-REFERENCES TO RELATED APPLICATION

This application claims priority from Japanese Patent Application Serial No. 2011-181458 filed Aug. 28, 2011 and No. 2012-112172 filed May 16, 2012, the contents of which are incorporated herein by reference in its entirety.

TECHNICAL FIELD

The present invention relates to a linear light source apparatus which can be used for a document illumination in an optical apparatus, such as a document reading scanner etc., and which uses LED(s) (light emitting diode(s)) as a light emitting element.

BACKGROUND

A linear light source is well known in which many LEDs are arranged in a line so as to be electrically connected in series and electricity is supplied to each of the LEDs simultaneously. Although the magnitude of the applied voltage necessary for such a series connection is high, since the current to be passed therethrough is the same as that in the case of one LED, a small current is sufficient as a whole and a drive circuit therefor is also simple. Thus there is an advantage in using a series connection in that an efficient device can be realized at low cost. On the other hand, since many LEDs are aligned for use, there is a problem that illumination unevenness occurs in a line illumination due to variations.

A system for avoiding such a problem is known in which a long and thin light guide member (optical guide) corresponding to a linear illumination area is prepared, and light from an LED(s) enters the light guide member from one of end faces or both of the end faces, and then linear illumination of the required area is carried out by the light, which leaks from the light guide member by micro-prisms which are formed and distributed over the light guide member. Since in this type of system, a plurality of LEDs is not arranged in a linear illumination area, even if there are variations in the LEDs, there is an advantage that the illumination unevenness in a linear illumination does not occur. On the other hand, since a few high intensity LEDs are turned on, although the required voltage is low, it is necessary to drive the LEDs with a large current, resulting in a reduction in the efficiency of the electric circuit. Furthermore, there is another problem in that a complicated drive circuit is needed so that the cost thereof becomes high. Moreover, since heat is intensively generated in the LEDs, there is an additional problem in that the temperature of the LEDs themselves becomes high easily.

For example, Japanese Patent Application Publication No. 2006-269140 discloses, as a method for treating heat generation of the LEDs in the aforementioned linear light source with a light guide member and high intensity LEDs, a light guide member made from transparent resin and an LED light source that are fixed to an elongated base. One end face in an axis direction of a rod shape member in a light guide member serves as a light taking-in portion, and the LEDs are arranged to face the light taking-in portion. The LEDs are fixed to an L shaped light source holding portion, and they are fixed to one end of the base, whereby part of heat conducted from the LEDs to the light source holding portion is conducted to the base so that heat is dissipated.

Further, for example, Japanese Patent Application Publication No. 2010-092780 discloses, as a means for efficiently cooling the aforementioned light source holding portion of the base, that a back side of a surface of the light source holding portion of the base, which is bonded to the bottom, is exposed to an air layer, that a convection of heat which passes through a radiating fin portion from the base arises, and that a wind flows into a gap of the fin parts by moving the light source apparatus in a direction perpendicular to an axis of the light guide member.

SUMMARY

Especially in the case of the above-mentioned linear light source where a light guide member and high-intensity LEDs are used, it is necessary to effectively transfer and process the heat from the LEDs, so that the LED themselves may not be deteriorated or damaged by the heat generated in the LEDs. Therefore, although it is necessary to achieve high electric efficiency of a system including a drive circuit and an electric supply system and to reduce total amount of heat generated, it was not enough in the case of the prior art to achieve the high electric and heat efficiency.

It is an object of the present invention to offer a linear light source apparatus capable of preventing generation of unnecessary loss in an electric circuit when high intensity LEDs are driven by low voltage and high current.

A linear light source apparatus of the present invention includes a thermally conductive frame, an LED, an LED drive circuit substrate. The LED drive circuit substrate drives the LED and has a substrate face. The linear light source apparatus further contains a flexible electric supply pattern substrate that has an LED mounting face, a connecting face and an electric supply pattern. The electric supply pattern corresponds to an anode or a cathode of the LED. An electric power is supplied to the LED from the LED drive circuit substrate via a pair of the electric supply patterns. Each of the electronic supply patterns has a first connecting portion and a second connection portion, the first connecting portion is located at the LED mounting face and is configured to be connected with the anode or the cathode. The second connecting portion is located at the connecting face and is configured to be connected with a third connecting portion of the LED drive circuit substrate.

The linear light source apparatus further contains a light guide member that propagates a light inputted from the LED, and a holding portion that holds the light guide member and the heat sink that is adjacent to the thermally conductive frame so that heat is conducted into the thermally conductive frame.

An opposite side face of the electric supply pattern substrate that is opposite from the LED mounting face is attached to the heat sink, so that heat generated by the LED is conducted into the heat sink through the electric supply pattern substrate. The LED drive circuit substrate is arranged along the thermally conductive frame. A covering face of the heat sink, to which the opposite side face is attached, is perpendicular to a length direction of the light guide member. The LED mounting face is perpendicular to a length direction of the light guide member, and is perpendicular to the substrate face of the LED drive circuit substrate.

A bent portion is formed in the flexible substrate between the LED mounting face and the connecting face so that the connecting face is parallel to the length direction of the light guide member and is parallel to the substrate face of the LED drive circuit substrate.

The LED mounting face and the connecting face may be on the same surface of the electric supply pattern substrate. The second connecting portion may be formed on a side of the electric supply pattern. An interval of the pair of the electric supply patterns near the second connecting portion may larger than an interval of the two electric supply patterns near the LED. A path of the electric supply pattern may be changed in direction on a way from the first connecting portion to the second connecting portion. The path may be in an L shape. The third connecting portion may have an exposed area that does not overlap with the electric supply pattern substrate. A thermal diffusion slowdown pattern may be formed near the second connecting portion or the third connecting portion on an electrical conduction layer. Fine holes may be formed on the opposite side face at the second connecting portion.

When the present invention is applied, it is possible to offer a linear light source apparatus, which can prevent generation of excessive loss in the electric circuit, when driving a high-intensity LED(s) with low voltage and high current.

BRIEF DESCRIPTION OF THE DRAWING

Other features and advantages of the present linear light source apparatus will be apparent from the ensuing description, taken in conjunction with the accompanying drawings, in which.

DESCRIPTION

Figure 1:
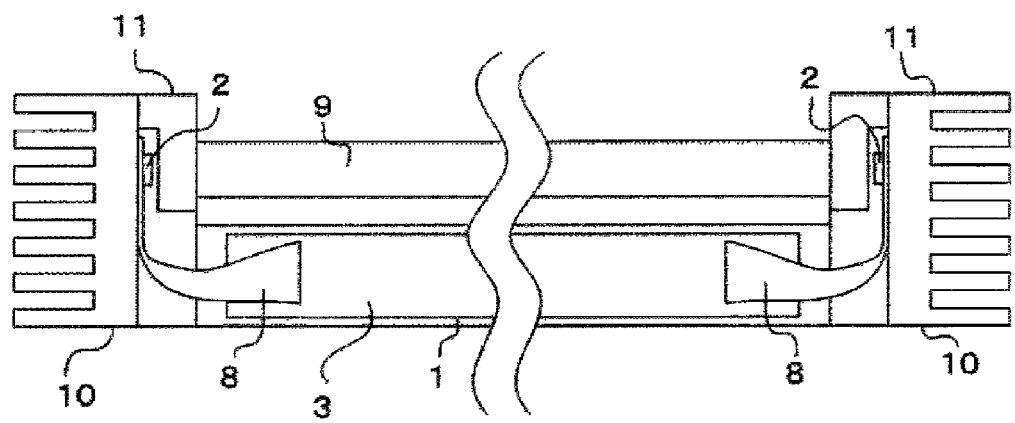
FIG. 1 is a simplified schematic projection view of an embodiment of a linear light source apparatus according to the present invention.

Description of an embodiment of a linear light source apparatus according to the present invention will be given below, referring to FIG. 1, which is a schematic view of the linear light source apparatus. Each of high-intensity type LEDs (2), which needs to be driven with high current, is mounted on a flexible electric supply pattern substrate (8). In addition, each of the electric supply pattern substrates (8) is connected to a LED drive circuit substrate (3) which is arranged along a thermally conductive frame (1), and the LEDs (2) are driven by the LED drive circuit substrate (3). Light emitted from each of the LEDs (2) is inputted into a rod shaped light guide member (9) from an end thereof. The light inputted into the light guide member (9) propagates while repeating a reflection inside the light guide member (9), and then is emitted from the light guide member (9) to the outside through micro-prisms (not shown), which are distributed in the light guide member (9), so that a predetermined area may be illuminated in line.

Since, a back side face of each electric supply pattern substrate (8) (the face opposite to the face upon which the LED is mounted) covers and is attached to a heat sink (10) disposed at least in the area near the LED (2), heat generated in the LED (2) flows into the heat sink (10), so that the heat is diffused from the LED (2) thereby cooling the LED (2). The heat sinks (10) are suitably made from material such as aluminum whose thermal conductivity is high and whose weight is light, and it is possible to even further raise the cooling efficiency of the LEDs (2) by forming the heat sinks (10) in a radiating fin shape.

Figure 2:
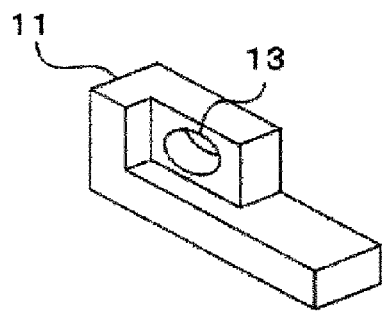
FIG. 2 is a schematic projection view of part of a linear light source apparatus according to an embodiment of the present invention.

Holding portions (11) hold the light guide member (9) so that the light guide member (9) may be maintained in a parallel position relationship with respect to the thermally conductive frame (1). Since each of the holding portions (11) is inserted between the heat sink (10) and the thermally conductive frame (1), and each holding portion (11) holds the heat sink (10) so as to connect the heat sink (10) and the thermally conductive frame (1) while forming thermal contacts with them, the heat of each heat sink (10) flows into the thermally conductive frame (1), and the heat sink (10) is cooled as a result. As shown in FIG. 2, which is a perspective view of one of the holding portions (11), a hole (13) is formed in the holding portion (11), whereby the light guide member (9) can be held therein by inserting an end of the light guide member (9) in this hole (13). In addition, it is designed so that the light guide member (9) may not rotate in the hole (13).

Since the LEDs (2), the electric supply pattern substrates (8), the heat sinks (10), and the holding portions (11) are symmetrically arranged at both ends of the light guide members (9), as shown in FIG. 1, a predetermined area can be illuminated in line by a total of two LEDs. In the case where a predetermined illuminance can be obtained with illumination by one LED, what is necessary is just to provide the LED (2), the electric supply pattern substrate (8) and the heat sink (10) at one end of the light guide member (9).

Figure 3A:
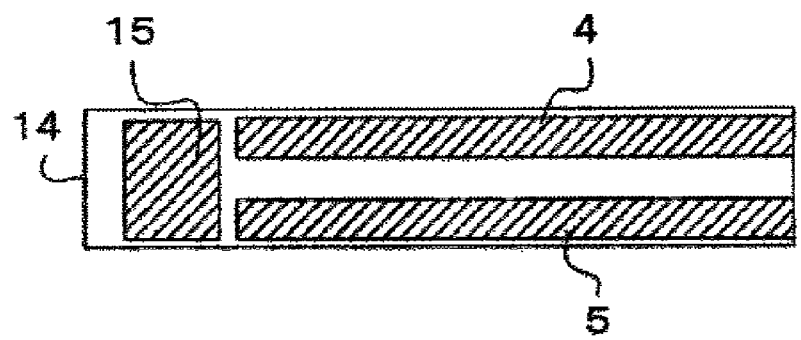
FIGS. 3A to 3D are schematic configuration diagrams of part of a linear light source apparatus according to an embodiment of the present invention.

Next, description of the electric supply pattern substrate (8) will be given below referring to FIGS. 3A to 3D, which are schematic views of the electric supply pattern substrate according to an embodiment of the present invention. The electric supply pattern substrate (8) is made using general flexible-wiring-board fabrication techniques. FIG. 3A shows a state where an electric supply pattern (4, 5), which is an electric conduction layer made from copper foil etc. and which corresponds to an anode and a cathode of the LED (2) for supplying electric power to the LED (2), is formed on a flexible base material (14) made from polyimide etc. While the LED (2) is fixed on an LED mounting face of the base material (14), an auxiliary pattern (15) for helping heat generated in the LED (2) to flow into the heat sink (10), is also formed thereon. In these figures, shaded portions show parts, which consist of the electric conduction layer.

Figure 3B:
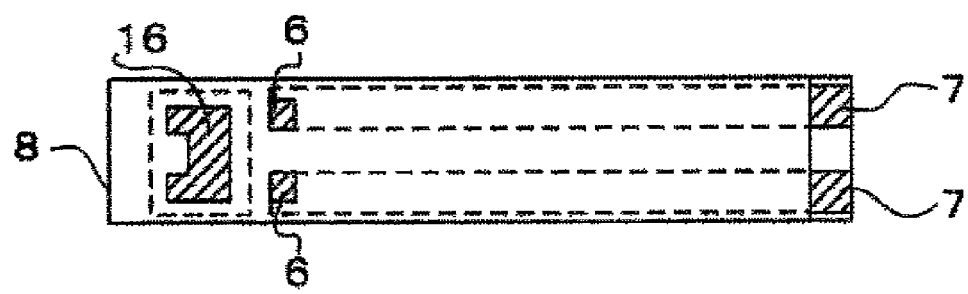

FIG. 3B is an outline view of the electric supply pattern substrate (8), wherein a cover film made of polyimide, resist, etc. is formed on the base material (14) having the pattern, which is shown in FIG. 3A. It should be noted that dashed lines show edges of the electric conduction layer pattern. Moreover, shaded portions (hatched lines) show portions where the electric supply pattern (4, 5) is exposed by forming openings in the cover film, using an etching technique such as photolithography, whereby connecting portions (6) for electric connection with the LED (2) and connecting portions (7) for electric connection with the LED drive circuit substrate (3) are formed. In addition, the hatched lines are also given to part of an auxiliary land (16) where a required part of the auxiliary pattern (15) is exposed from the cover film.

Figure 3C:

FIG. 3C is a diagram showing a state where the LED (2) is mounted on the electric supply pattern substrate (8). In addition, when the LED (2) is mounted on the electric supply pattern substrate (8), in general, a reflow solder technology is used, wherein, after cream solder is applied to the connecting portions (6) for electric connection with the LED (2) and the auxiliary land (16), the LED (2) is put thereon, and thereafter solder is melted by heating it in a furnace.

Figure 3D:
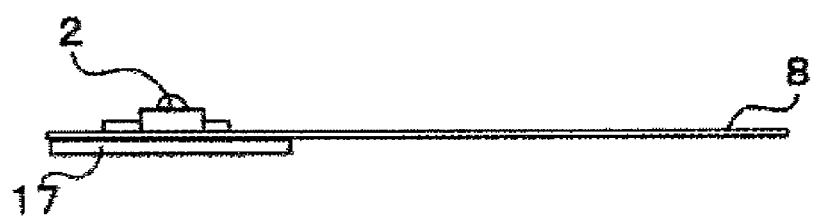

FIG. 3D is a side view of the electric supply pattern substrate (8) and the LED (2) mounted on the electric supply pattern substrate (8). In this figure, an auxiliary heat conduction plate (17), which is made from material having good heat conductivity, for example, material such as copper, aluminum, etc., covers and is attached to a face of the electric supply pattern substrate (8), which is on the opposite side of the face where the LED (2) is mounted. The same adhesive as that used when forming the electric conduction layer on in the base material (14) may be used for the attachment.

As described above, since the back side face is supposed to be attached to the heat sink (10) so as to cover the heat sink (10) near the LED (2) and the auxiliary heat conduction plate (17) is attached to the back side face, what is necessary to conduct the heat generated in the LED (2) out to the heat sink (10) is just to attach the auxiliary heat conduction plate (17) to the heat sink (10) so as to cover the heat sink (10) so that the auxiliary heat conduction plate (17) and the heat sink (10) are integrated into each other as one unit. However, while the auxiliary heat conduction plate (17) may be advantageous to increasing heat conduction, it is possible to not include the auxiliary heat conduction plate (17) between the heat sink (10) and the electric supply pattern substrates (8), and the cases where the auxiliary heat conduction plate (17) is or is not included will not hereinafter be distinguished from each other.

As shown in FIG. 3C, when the auxiliary heat conduction board (17) is attached to the heat sink (10) so as to cover the heat sink (10), if a holding hole (18) is provided so as to penetrate the electric supply pattern substrate (8) and the auxiliary heat conduction board (17), and a screw hole is formed in the heat sink (10), it is possible to fix the auxiliary heat conduction board (17) thereto by a screw, whereby the workability at time of an assembly can be improved. In addition, when a heat conduction compound, heat dissipation grease, etc. is applied between the auxiliary heat conduction board (17) and the heat sink (10), it is advantageous in view of improvement of the thermal conductivity.

Figure 4:
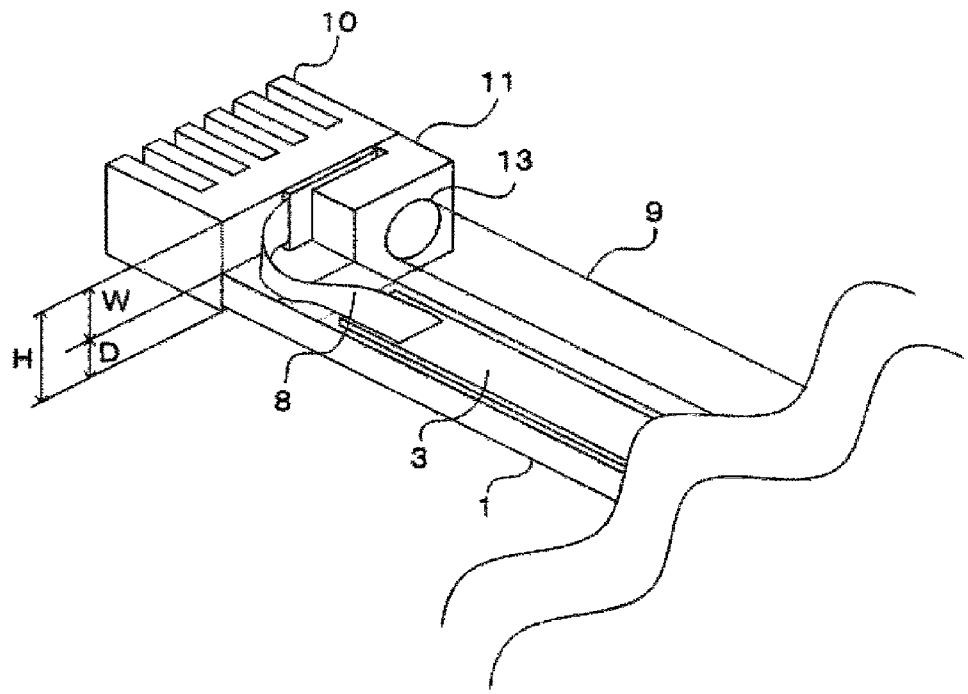
FIG. 4 is a schematic perspective view of part of a linear light source apparatus according to an embodiment of the present invention.

As is apparent from FIG. 4, which is a perspective view of part of the apparatus near one end of the linear light source apparatus shown in FIG. 1, the adhered face of the heat sink (10), to which the electric supply pattern substrate (8) is attached, is perpendicular to a length direction of the light guiding material (9), so that a substrate face of the electric supply pattern substrate (8) near the LED (2) is perpendicular to a length direction of the light guiding portion material (9) and is perpendicular to a substrate face of the LED drive circuit board (3). However, as the electric supply pattern substrate (8) is bent with distance from the LED (2) toward the connecting portion for connection with the LED drive circuit board (3), it becomes parallel to a length direction of the light guiding material (9) and the substrate face of the LED drive circuit board (3). The connecting portions (7) of the electric supply pattern substrate (8) for electric connection with the LED drive circuit board (3) and connecting portions (12) of the LED drive circuit board (3) for electric connection with the electric supply pattern substrate (8) are connected to each other by, for example, soldering.

Description of the features of the above-mentioned linear light source apparatus according to the present invention will be given below. A power supply path from a power supply unit of a main body apparatus such as a document reading scanner in which the linear light source apparatus is installed, to a linear light source apparatus, tends to be long in length and thin in thickness. The power supply path becomes thin in thickness because only a thin wiring with high flexibility is allowed to be attached to a movable carriage for a sub-scan of document reading in the linear light source apparatus. Although a loss of the power supply path increases in proportion to a square of a value of current to be supplied (loss $\sim I^2$), since a thin power supply path is large in electrical resistance, the loss thereof increases remarkably due to an increase in current. Therefore, it can be said that when the same electric power (P=I·V) is supplied, a condition in which voltage is high and current is low is advantageous compared to a condition in which voltage is low and current is high, in view of the conditions in the power supply path from the power supply unit of the main body apparatus to the linear light source apparatus.

The driving voltage of the high-intensity type LEDs used in the linear light source apparatus according to the present invention is approximately 3.5 V, and the drive current is approximately 1 A, typically. As shown in FIG. 1, when two LEDs are used at the respective ends of the light guiding portion material (9), if they are connected in series and electricity is passed therethrough, approximately 7 V and 1 A are needed for driving.

Therefore, since a circuit type of the LED drive circuit board (3) is, for example, a step down type DC-DC converter such as a step down chopper type, voltage of 24 V is typically inputted therein. Therefore, supposing that the applied power to the LEDs (2) is 7 W, even taking a loss thereof into consideration, current of approximately 0.32-0.35 A is enough for the current to be supplied to the LED drive circuit board (3) from the power supply unit of the main body apparatus. In the linear light source apparatus according to the present invention, since the LED drive circuit board (3) is arranged at the thermally conductive frame (1), the length of a current path through which a large current unavoidably flows is shortened—only the portion from the LED drive circuit board (3) to the LED (2), i.e., the electric supply pattern substrate (8), carries the comparatively large current. This satisfies the advantageous conditions on the power supply path from the power supply unit of the main body apparatus to the linear light source apparatus, whereby when the high-intensity LEDs according to the present invention are driven with the low voltage and large current, there is an effect in which generation of the excessive loss is prevented in an electric circuit.

Moreover, in the case of the present invention, as described above, the entire portion from the LED drive circuit board (3) to the LED (2), which is a current path where large current unavoidably flows, is formed in a low resistance manner such as soldering etc. This eliminates high loss and lack of stability factors due to contact resistance from a connector, and it is possible to secure high efficiency and high reliability. In addition, the LED drive circuit board (3) should not be a dropper system, even if the circuit is a step down type DC-DC converter, because dropper systems have a large loss, and, accordingly, are inappropriate as the LED drive circuit used for the present invention.

It is meaningful to provide the electric supply pattern substrate (8) in the linear light source apparatus according to the present invention so that each electric supply pattern substrate (8) may be bent as shown in FIG. 4. Although the electric supply pattern substrate (8) is twisted 90 degrees when bending the electric supply pattern substrate (8), if it is twisted in an opposite direction thereto, it is necessary to form the connecting portion (7) of the electric supply pattern substrate (8) for electric connection with the LED drive circuit board (3) shown in the FIG. 3B, on a face of a backside with respect to a face of the electric supply pattern substrate (8) where the connecting portion (6) exists. Of course, although it is possible to make such a device, it is advantageous with respect to cost, to form the connecting portions (6) for electric connection with the LED (2) and the connecting portions (7) for electric connection with the LED drive circuit board (3) on the same side of the electric supply pattern substrate (8) as each other, as shown in FIG. 3B.

Although there is demand for a miniaturization of an optical device such as a document reading scanner etc, since the sizes with respect to original documents to be scanned thereby may not be made small, there is demand for making the optical devices thinner, and moreover there is also strong demand for making thinner the linear light source apparatus according to the present invention which is installed therein. As is apparent from FIG. 4, the height H of the linear light source apparatus according to the present invention is made up of the thickness D of the thermally conductive frame (1) and the width W of the electric supply pattern substrate (8). The thermally conductive frame (1) serves as a structural framework of the linear light source apparatus according to the present invention. There is also an effect on cooling the heat sinks (10), since heat of the heat sinks (10) are conducted into the thermally conductive frame (1). Therefor, it is necessary to determine the thickness D so that it may have mechanical stiffness and heat capacity corresponding to this effect.

On the other hand, the width W is made up of the width of the electric supply pattern (4, 5) and an interval of strips of the electric supply pattern (4, 5) on the electric supply pattern substrate (8). It is necessary to determine the width of the strips of the electric supply pattern (4, 5), so that a loss thereof falls within an acceptable range depending on current to be passed therethrough, and to determine the width of an interval between the strips of the electric supply pattern (4, 5) so as to have sufficient dielectric strength to withstand the voltage impressed between the anode and the cathode of the LED (2). However, since the voltage impressed between the anode and the cathode of the LEDs (2) is approximately 3.5 V as described above, it turns out that the interval of the electric supply pattern (4, 5) may be very small.

There is a reason, however, that the interval between the connecting portions (7) on the electric supply pattern substrate (8) shown in FIG. 3B cannot be determined based on only the dielectric strength thereof. This is because the connecting portions (7) of the electric supply pattern substrate (8) and the connecting portions (12) of the LED drive circuit board (3) are faced toward each other, are pressed to each other, and then are connected to each other by soldering, which results in solder running off therefrom, whereby short circuit tends to occur if the connecting portions (7) are too close to each other.

In this case, there is a reason that solder further tends to runs off therefrom. As described above, when the LED (2) is mounted on each electric supply pattern substrate (8), generally, a reflow solder technology using cream solder is used. However, the LED drive circuit board (3) is also made by mounting parts such as a switching element (for example, an FET), a choke coil, an IC etc. on a circuit board whose base material is glass epoxy etc. using the above-mentioned reflow solder or a flow solder technology, in which a jet stream of melted solder is used. Thus the reflow soldering technology can no longer be used to connect the connecting portions (7) and the connecting portions (12) because it would be necessary to heat them in a furnace and to melt a solder, in order to perform the reflow soldering, as described above, resulting in the reflow solder or flow solder portions on the electric supply pattern substrate (8) and the LED drive circuit board (3), which have been finished previously, being melted.

Therefore, only a method of locally heating only portions to be heated can be used for the soldering connection between the connecting portions (7) of the electric supply pattern substrate (8) and the connecting portions (12) of the LED drive circuit board (3). Therefore, since it is necessary to form solder connection by pressing a heating element such as a soldering iron manually or by automated apparatus against portions to be soldered from the base material (14) side of the thin electric supply pattern substrate (8), so that a preparatory solder applied to the connecting portions (7) and/or one of the connecting portions (12) is melted, the solder tends to runs off onto a portion of a pattern interval where there is no electrical conduction layer such as copper foil, whereby short circuit tends to occur.

Therefore, as shown in FIG. 3B, the interval of the connecting portions (7) in each of the electric supply pattern substrates (8) needs to have such a size that a short circuit does not occur even if the solder runs off in some degree. However, this means that the width of the electric supply pattern substrates (8) becomes large so that it is difficult to shorten the width W.

Description of a modified embodiment, in which this difficulty is avoided, will be given below, referring to FIG. 5. In this figure, each connecting portion (7) for electric connection with an LED drive circuit board (3), which is provided on an electric supply pattern substrate (8), is formed on a side portion of the corresponding strip of the electric supply pattern (4, 5), wherein the side portion is located on the side of the strip furthest from the other strip. Similarly to FIG. 3B, dashed lines show edges of strips of an electric conduction layer pattern and shade portions (hatched lines) show areas where the electrical conduction layer is exposed by forming openings in a cover film. In the electric supply pattern substrate (8) as shown in FIG. 3B, a connecting portion (7) is provided at the tip of each of the strips of the electric supply pattern (4, 5). However, the electric supply pattern substrate (8) shown in FIG. 5 is different from that shown in FIG. 3B, in that each connecting portion (7) is formed only on the outside edge of each of the two strips of the electric supply pattern (4, 5).

Since an interval of the connecting portions (7), i.e., an interval of the openings provided in a cover film, can be fully secured in such a structure, the interval of the electric supply pattern (4, 5) can be made very small. As a result, it is possible to shorten the width W, while a short circuit does not occur even if the solder runs off in some extent.

Figure 5:
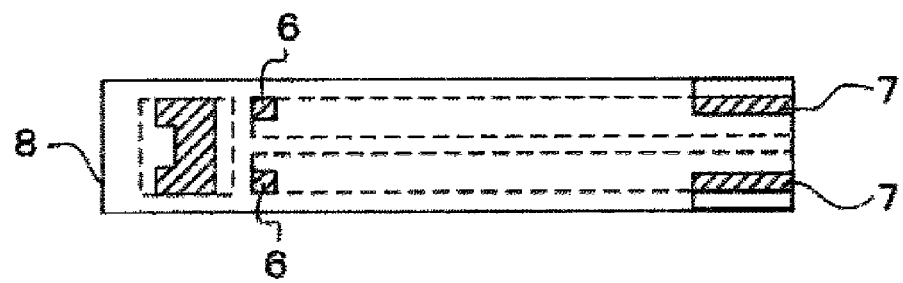
FIG. 5 is a schematic configuration diagram of part of a linear light source apparatus according to an embodiment of the present invention.

In addition, when the whole width of the strips of the electric supply pattern (4, 5) is not used for the connecting portions (7) in FIG. 5, the length of area of the connecting portions (7) in a longitudinal direction of the electric supply pattern (4, 5) is extended so as to be compensated in order that a required area is secured as the connecting portions (7). Of course, it is necessary to design the shape and arrangement of connecting portions (12) of an LED drive circuit board (3), so as to correspond with the shape and arrangement of the connecting portions (7) of the electric supply pattern substrate (8) which is formed in such a manner.

Figure 6:
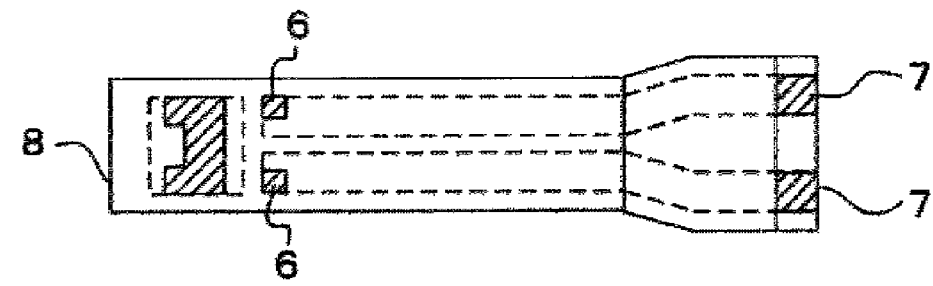
FIG. 6 is a schematic configuration diagram of part of a linear light source apparatus according to an embodiment of the present invention.

Description of another modified embodiment, in which the difficulty of having to alter the shape and arrangement of connecting portions (12) so as to match the altered connecting portions (7) is avoided, will be given below, referring to FIG. 6. In this figure, a mutual interval of strips of an electric supply pattern (4, 5) near a connecting portions (7) for electric connection with an LED drive circuit board (3), which is formed on an electric supply pattern substrate (8), is larger than that near an LED (2). In this figure, dashed lines show edges of the pattern of an electrical conduction layer similarly to that in FIG. 3B, and shaded portions (hatched lines) show areas where the electrical conduction layer is exposed by forming openings in a cover film. FIG. 6 is the same as FIG. 3B in that each connecting portion (7) is formed at the tip of each of two strips of the electric supply pattern (4, 5) on the electric supply pattern substrate (8). However, in FIG. 6, while the mutual interval of the two strips of the electric supply pattern (4, 5) near the connecting portions (7) for electric connection with the LED drive circuit board (3), is such a size that the interval of the connecting portions (7) may be secured to the extent that a short circuit does not occur even if the solder runs off in some extent, the interval of the strips of the electric supply pattern (4, 5) near the LED (2) can be made small, so that the effect of shortening the width W may be acquired.

Figure 7:
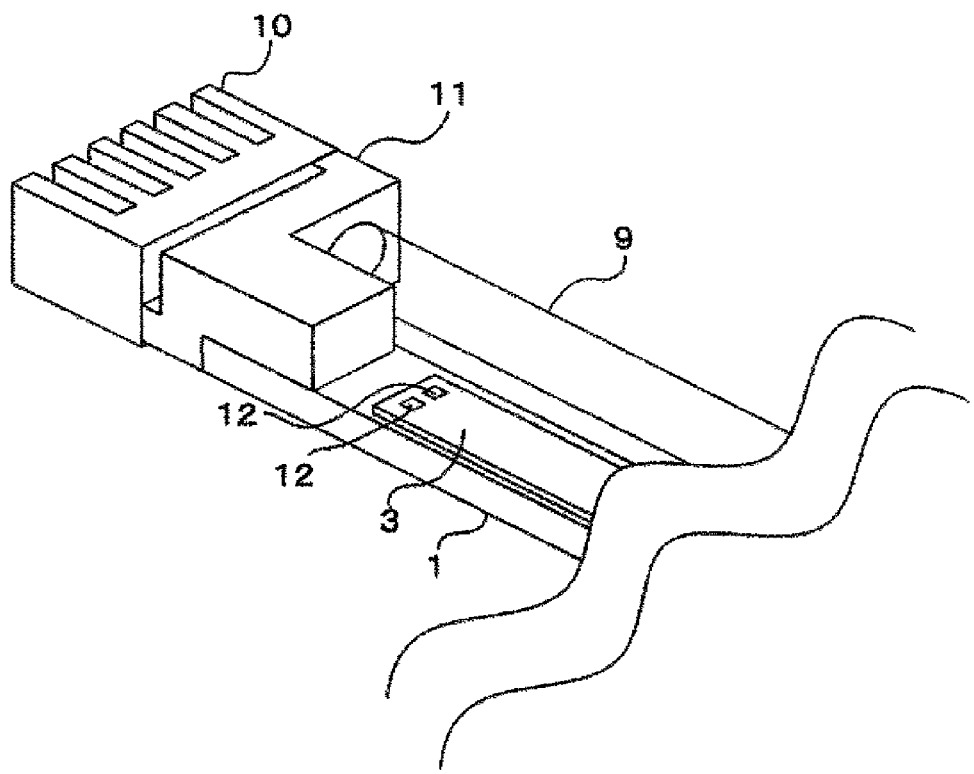
FIG. 7 is a schematic perspective view of part of a linear light source apparatus according to an embodiment of the present invention.

As described above, since holding portions (11) respectively intervene between the heat sinks (10) and the thermally conductive frame (1), and hold the heat sinks (10) so as to form thermal contacts with both of them thereby connecting both of them, heat of the heat sinks (10) is conducted into a thermally conductive frame (1) so that the heat sinks (10) may be cooled. Therefore, the thermal coupling between the holding portion (11) and the thermally conductive frame (1) is desirably strong. Based on such a demand, when the shape of the holding portions (11) is changed as shown in FIG. 7, since a protruding portion of the holding portion (11) is provided in order to increase thermal coupling between the thermally conductive frame (1) and the holding portion (11), it is desirable to change an installation configuration of an electric supply pattern substrate (8) from that shown in FIG. 4.

A change made from such a viewpoint will be explained below, referring to FIG. 8. In this figure, directions of paths of an electric supply pattern (4, 5) of the electric supply pattern substrate (8), corresponding to an anode and a cathode of an LED (2), are changed together, on the way to connecting portions (7) for electric connection with an LED drive circuit board (3) from connecting portions (6) for electric connection with the LED (2). Specifically, two strips of the electric supply pattern (4, 5) are bent together by approximately 90 degrees in the respective middle portions thereof, so as to form L shaped paths, respectively. The whole electric supply pattern substrate (8) is also formed in L-shape so as to correspond to the paths. In this figure, dashed lines show edges of the pattern of an electrical conduction layer similarly to that in FIG. 3B, and shaded portions (hatched lines) show areas where the electrical conduction layer is exposed by forming openings in a cover film.

Figure 9:
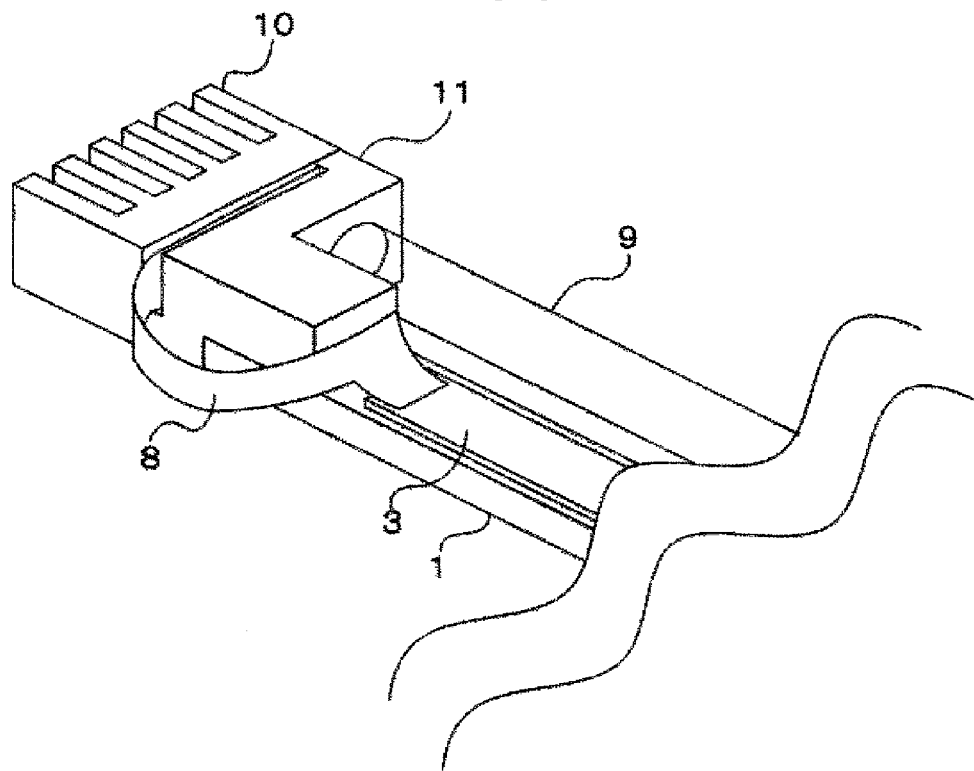
FIG. 9 is a schematic perspective view of part of a linear light source apparatus according to an embodiment of the present invention.

FIG. 9 shows a state where this electric supply pattern substrate (8) is installed in a form in which thermal coupling between a holding portion (11) and a thermally conductive frame (1) is increased. Unlike the case of FIG. 4, which is described above, an electric supply pattern substrate (8) shown in this figure is not twisted 90 degrees. Instead of that, since each of two straight line portions of the L-shaped electric supply pattern substrate (8) is bent, it is possible to avoid interference with a protruding portion, which is provided to increase the thermal coupling between the thermally conductive frame (1) and the holding portion (11), so that a connection with connecting portions (12) of an LED drive circuit board (3) is attained.

Figure 8:
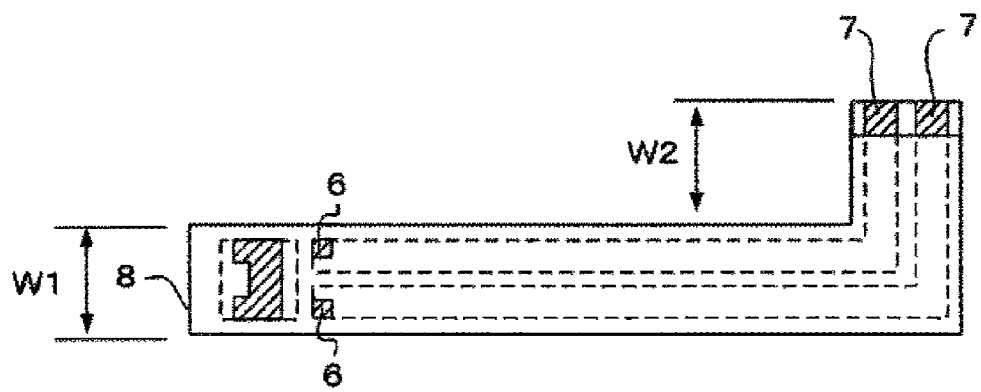
FIG. 8 is a schematic configuration diagram of part of a linear light source apparatus according to an embodiment of the present invention.

Moreover, the electric supply pattern substrate (8) shown in FIG. 8 may also have a feature in which, as in the electric supply pattern board shown in FIG. 6, the mutual interval of the strips of the electric supply pattern (4, 5) on the electric supply pattern substrate (8) near the connecting portion (7) for electric connection with the LED drive circuit board (3) (2), is larger than that near the LED. As described above, the mutual interval of the strips of the two electric supply patterns (4, 5) near the connecting portions (7) for electric connection with the LED drive circuit board (3), is such a size that the interval of the connecting portions (7) may be secured to the extent that short circuit does not occur even if the solder runs off in some extent. On the other hand, the interval of the strips of the electric supply pattern (4, 5) near the LED (2) can be made small, so that the effect of shortening the width W may be acquired.

When the L-shaped electric supply pattern substrate (8) shown in FIG. 8 is produced by cutting out (punching) from one sheet of base material, if material remnants are produced, the number of production thereof decreases so that there is a problem that the cost per one electric supply pattern substrate (8) may go up. In this case, as to the size of the L-shaped electric supply pattern substrate (8) shown in FIG. 8, it is advantageous that the length W2 of a protruding portion of the short side part of the L-shaped portion, is approximately equal to the width W1 of a portion of the connecting portion (6) for electric connection with the LED (2). This is because when the relation of the widths W1 and W2 is set as described above, it is possible to form a full rectangle pattern which is made up of two L-shaped substrates by combining, a pair of substrates, one of which is shown in FIG. 8, and each of which is rotated by 180 degrees on a plane.

Figure 10:
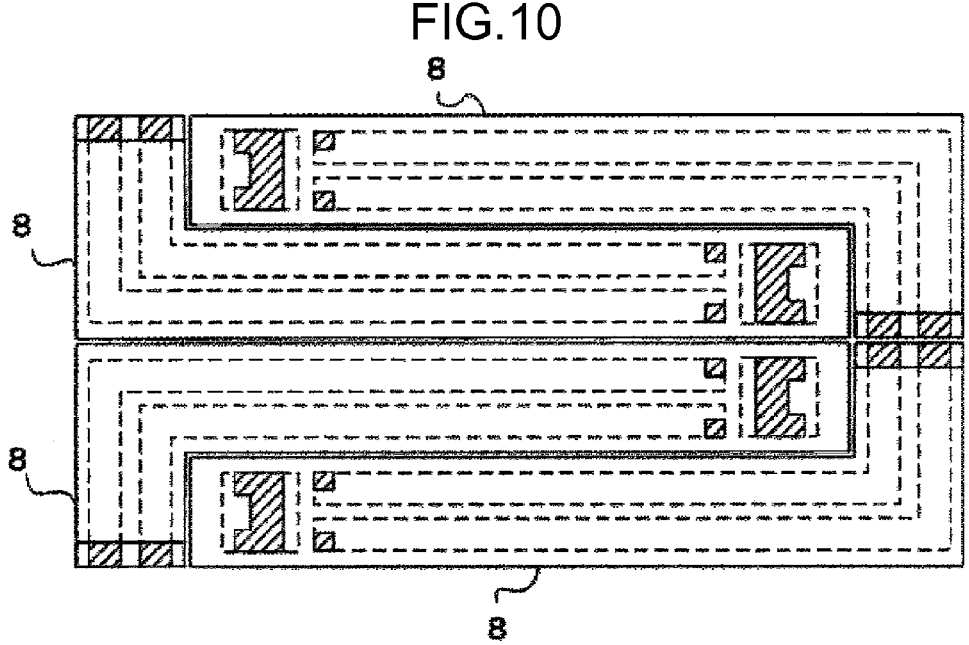
FIG. 10 is an explanatory diagram relevant to an embodiment of a linear light source apparatus according to the present invention.

Moreover, as in FIG. 1, in the case where the LEDs (2), the electric supply pattern substrates (8), the heat sinks (10), and the holding portions (11) are arranged at both ends of the light guiding portion material (9), a full rectangle pattern, which is made up of two L-shaped substrates and a reversed rectangle pattern, which is a mirror image of the full rectangle pattern, are combined with each other so as to form a full rectangle pattern which is made up of the four L-shaped substrates shown in FIG. 10. In this figure, dashed lines show edges of the pattern of the electrical conduction layer, similarly to that in FIG. 3B, and shaded portions (hatched lines) show areas where the electrical conduction layer is exposed by forming openings in a cover film. Since the full rectangle pattern which is made up of two or four L-shaped substrates is a plane filled (tessellation) figure, so that production of material remnants can be kept to the minimum, so that it is possible to prevent excessive cost by applying the present invention.

For a further improvement of the linear light source apparatus according to the present invention, a soldering method of a flexible circuit board and a printed circuit board may be used, wherein in the flexible circuit board, an electrical conduction layer pattern made of material such as copper foil, is coated on a flexible substrate material made of, for example, polyimide, a cover film made of material such as polyimide and resist etc. is coated thereon, and openings are formed in the cover film so that the flexible circuit board has the structure in which the electrical conduction layer pattern exposed area is formed in the openings, wherein base material of the printed circuit board is glass epoxy etc., and an electrical conduction layer pattern exposed area made of material such as copper foil, is provided in the printed circuit board so as to face and correspond to the above-mentioned electrical conduction layer pattern exposed area, so that electrical connection and mechanical attachment are made by a solder layer which is intervened between the above-mentioned electrical conduction layer pattern exposed area and it, when facing, bringing in contact with and heating the electrical conduction layer pattern exposed area, wherein an additional electrical conduction layer exposed portion is provided near a portion connected with the electrical conduction layer pattern exposed area of the printed circuit board, and at a portion which does not overlap with the flexible circuit board, and wherein while a heating element is pressed against the portion of the flexible base material, which corresponds to the electrical conduction layer pattern exposed portion of the flexible circuit board at time of soldering of the flexible circuit board and the printed circuit board, a heating element is also pressed against the additional electrical conduction layer exposed portion.

Moreover, a soldering method of a flexible circuit board and a printed circuit board wherein in the flexible circuit board, an electrical conduction layer pattern made of material such as copper foil, is coated on a flexible substrate material made of material such as polyimide, a cover film made of material such as polyimide and resist etc. is coated thereon, and openings are provided in the cover film so that the flexible circuit board has the structure in which the electrical conduction layer pattern exposed area is formed in the openings, wherein base material of the printed circuit board is glass epoxy etc., and an electrical conduction layer pattern exposed area made of material such as copper foil, is provided in the printed circuit board so as to face and correspond to the above-mentioned electrical conduction layer pattern exposed area, so that electrical connection and mechanical attachment are made by a solder layer which is intervened between the electrical conduction layer pattern exposed area and it, when facing, bringing in contact with and heating the electrical conduction layer pattern exposed area, wherein fine pores are formed so as to be distributed in part of the flexible base material, which corresponds to the electrical conduction layer pattern exposed area of the flexible circuit board, and at least part of an area which is made up of part of the flexible base material near the exposed area, and wherein at time of soldering of the flexible circuit board and the printed circuit board, a heating element is pressed against the part of the flexible base material, which corresponds to the electrical conduction layer pattern exposed area of the flexible circuit board.

As described above, for the solder connection between the connecting portions (7) of the electric supply pattern substrate (8) and the connecting portions (12) of the LED drive circuit board (3), it is necessary to melt a preparatory solder applied to the connecting portions (7) of the electric supply pattern substrate (8), one of the connecting portions (12) of the LED drive circuit board (3), or both of them, thereby forming solder connection by means for heating only a local portion, that is, by pressing the heating element from a base material (14) side of the thin electric supply pattern substrate (8).

However, when using this means of soldering, the efficiency of the heat inflow from the heating element through the base material (14) of the electric supply pattern substrate (8) is not high, and there is a problem in that it takes time to melt the preparatory solder and/or it is necessary to raise the temperature of the heating element. As for the problem, since the electrical conduction layer made from copper foil etc. in the electric supply pattern substrate (8) and the LED drive circuit board (3) is fixed by using only the base material and the adhesive agent, it takes time to make solder connection and/or there is a chance that the bonded part will come off when the temperature thereof becomes high.

Figure 11A:
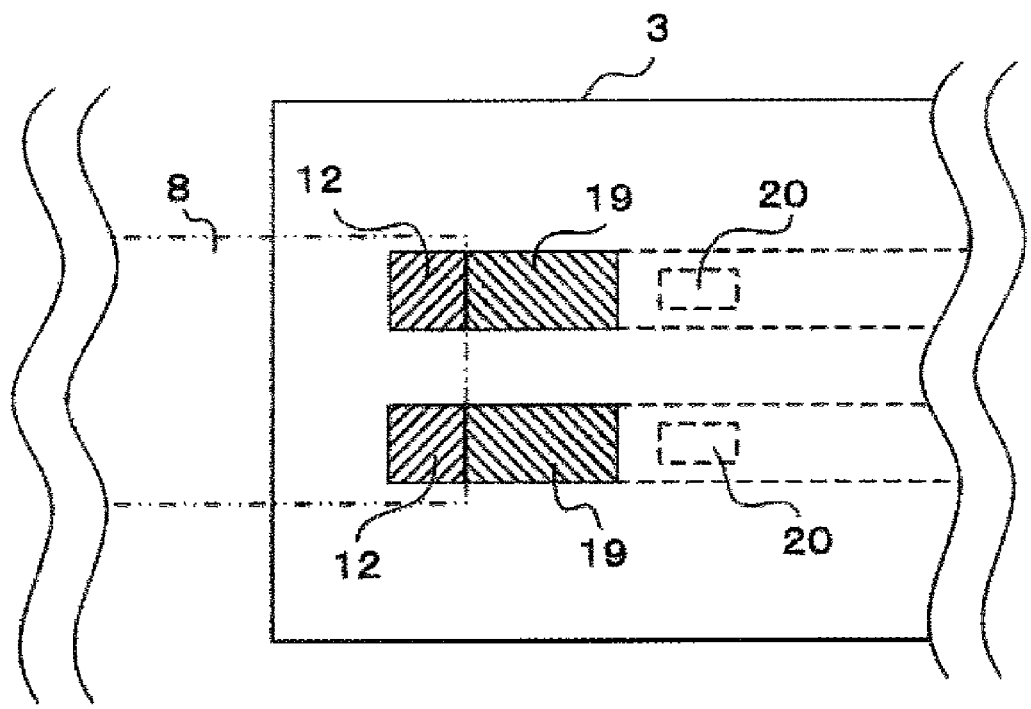
FIGS. 11A and 11B are schematic configuration diagrams of part of a linear light source apparatus according to an embodiment of the present invention.
Figure 11B:
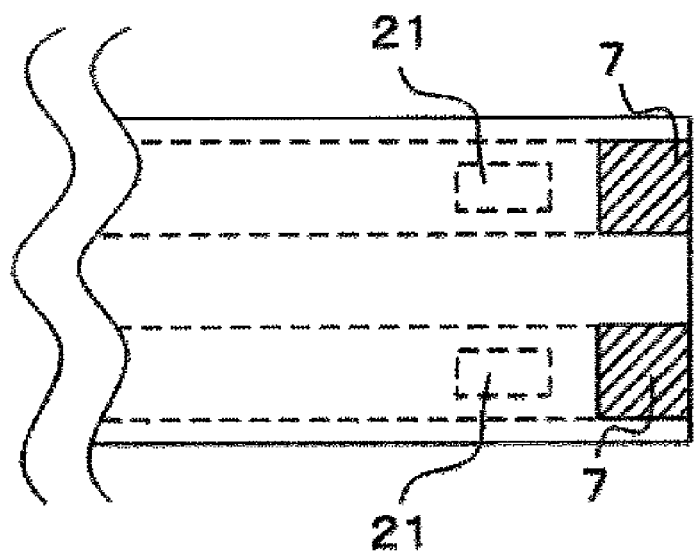

Description of an improvement for avoiding this problem will be given below referring to FIGS. 11A and 11B. In these figures, dashed lines show edges of the pattern of an electrical conduction layer similarly to that in FIG. 3B, and shaded portions show areas where the electrical conduction layer is exposed by forming openings in a cover film. In FIG. 11A, exposed areas (19) of the electric conduction layer of the LED drive circuit board (3), which do not overlap with the electric supply pattern substrate (8), are provided in the connecting portion (12) for electric connection with the electric supply pattern substrate (8), on the LED drive circuit substrate (3). A dashed-two dotted line shows the electric supply pattern substrate (8), which is arranged at time of a soldering connection operation.

The electrical conduction layer, which is made from copper foil etc. and which is on a side of the LED drive circuit board (3), etc. has large heat capacity. Therefore, if the exposed portion (19) of the electrical conduction layer is provided at the position of a portion which is not covered with the electric supply pattern substrate (8) arranged at the time of a soldering connection operation, it is possible to take measures for heating the electrical conduction layer on a side of the LED drive circuit board (3) by, for example, pressing a heating element against this. Thereby, it is possible to increase heat amount applied into the preparatory solder thereby avoiding the above-mentioned problem.

In addition, in FIG. 11A, in order to prevent heat from escaping to the connecting portion (12) where a preparatory solder is to be melted, or a right side (as viewed in FIG. 11A) of the exposed portion (19) of the electrical conduction layer, holes are formed on paths of the electrical conduction layer of the LED drive circuit board (3), thereby forming a thermal diffusion slowdown pattern (20). Similarly, in FIG. 11B, in order to prevent heat from escaping to a left side (as viewed in FIG. 11B) thereof from the connecting portions (7) on the electric supply pattern substrate (8) where a preparatory solder is to be melted, holes are formed on paths of the electric conduction layer of the electric supply pattern substrate (8), thereby forming a thermal diffusion slowdown pattern. A small width portion, which is short in a length direction thereof, may be formed in the thermal diffusion slowdown pattern (20) of the LED drive circuit board (3) and/or the thermal diffusion slowdown pattern (21) of the electric supply pattern substrate (8) in order to reduce heat conduction to the extent that electrical conduction is not deteriorated. When such a pattern portion is provided on either a side of the LED drive circuit board (3) or a side of the electric supply pattern substrate (8) or both of them, there is an effect that the melting of a preparatory solder is accelerated, whether or not the exposed portion (19) of the electrical conduction layer is provided in the LED drive circuit board (3). In addition, such a pattern for reducing heat conduction to the extent that electrical conduction is not deteriorated, is sometimes called a thermal pattern.

Figure 12:
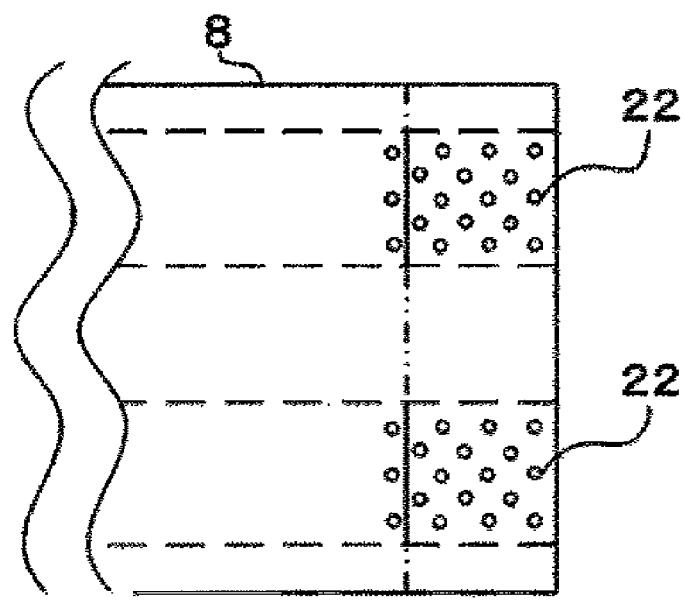
FIG. 12 is a schematic figuration diagram of part of a linear light source apparatus according to an embodiment of the present invention.

Description of a further improvement for avoiding the problem will be given below, referring to FIG. 12. In addition, although FIG. 12 shows a portion near the connecting portions (7) for electric connection with the LED drive circuit board (3) shown in FIG. 3B, which shows the electric supply pattern substrate (8). Specifically, FIG. 12 shows an opposite side face opposite to the LED mounting face of FIG. 3B, that is, it is a view, which is seen from a side of the base material (14). In this figure, dashed lines show edges of the pattern of the electrical conduction layer, and dashed-two dotted lines show edges of a cover film made from polyimide, resist, etc., on a side which faces a connecting portion (12) of the LED drive circuit board (3).

As shown in FIG. 12, the fine pores (22) are formed near the connecting portions (7) for electric connection with the LED drive circuit board (3) in the electric supply pattern substrate (8), so as to be aligned and distributed in the base material (14). Therefore, when a heating element is pressed from a side of a base material (14) of the electric supply pattern substrate (8), since a degree of a thermal contact with the heating element increases in the portion of the fine pores (22), it is possible to improve the efficiency of the heat inflow from the heating element through the base material (14) of the electric supply pattern substrate (8), whereby the problem can be avoided. In addition, when a preparatory solder is also applied to the portion of the fine pores (22), or melted solder is applied to the heating element, in advance, a degree of the thermal contact between the portion of the fine pores (22) and the heating element can be further raised.

However, as described above, the cover film on the side facing the connecting portions (12) of the LED drive circuit board (3) is removed with respect to the connecting portions (7) for electric connection with the LED drive circuit board (3), on the electric supply pattern substrate (8). Therefore, since in that portion, the fine pores (22) are distributed in the base material (14) which backs and supports the electrical conduction layer made from the copper foil etc., the electrical conduction layer with the portion of the fine pores (22) must exist alone, so that the size of the fine pores (22) is required so as to be small according to the thickness of the electrical conduction layer. For example, when the fine pores (22), which are circular, are formed in the base material (14), the diameter thereof should be approximately 10 times or less the thickness of the electrical conduction layer.

However, the flexible circuit board, which is described above as a general technical term, corresponds to the electric supply pattern substrate (8) in the structure of the linear light source apparatus according to the present invention.

Similarly, the printed circuit board of the general technical term corresponds to the LED drive circuit board (3) according to the present invention. In addition, the electrical conduction layer pattern exposed area in the flexible circuit board of the general technical term corresponds to the connecting portions (7) for electric connection with the LED drive circuit board (3) in the electric supply pattern substrate (8) according to the present invention. Further, the electrical conduction layer pattern exposed area in the printed circuit board of the general technical term corresponds to the connecting portion (12) for electrically connecting the electric supply pattern substrate (8) in the LED drive circuit board (3) according to the present invention. Furthermore, the additional electrical conduction layer exposed portion of the general technical term corresponds to the exposed portion (19) of the electrical conduction layer according to the present invention.

As described above, heat generating driver elements such as a switching element (FET etc.), a flywheel diode, a choke coil, and a transformer, drive current feed to the LED, generate heat by themselves, are mounted on the LED drive circuit board (3). Such elements need cooling similarly to the LED (2). However, when the heat generating driver elements and the thermally conductive frame (1) are thermally contacted to each other, it is possible to use the thermally conductive frame (1) as means for cooling the heat generating driver elements, since the heat generated by the heat generating driver elements is conducted into the thermally conductive frame (1). However, cautions are also required to use the thermally conductive frame (1) in order to cool the heat generating driver elements. As described above, as to the thermally conductive frame (1), since the heat of the heat sink (10) must be conducted into the thermally conductive frame (1) and the heat sinks (10) must be cooled, when a balance of the heat inflow position from the heat sinks (10) to the thermally conductive frame (1) and the heat inflow position from the heat generating driver elements is not good, there is a problem that the cooling efficiency decreases.

In order to avoid this problem, it is suitable that the thermal contact position of the heat generating driver elements to the thermally conductive frame (1), is the most distant position from the heat inflow position from the heat sinks (10) in a length direction of the thermally conductive frame (1). Specifically, in the case where the LED (2), the electric supply pattern substrate (8), the heat sink (10), and the holding portion (11) are arranged at both ends of the light guiding portion material (9), the center of the thermally conductive frame (1) is suitable as the thermal contact position of the heat generating driver elements with respect to the thermally conductive frame (1). In the case where the LED (2), the electric supply pattern substrate (8) and the heat sink (10), are arranged at one end of the light guiding portion material (9), the other end portion of the thermally conductive frame (1) is suitable as the thermal contact position thereof. This is because it does not depend on the ratio of the generated heat amount of the LED (2) and that of the heat generating driver elements, and influence of the heat received from the other side of the LED (2) or each heat generating driver element is made the smallest by the arrangement of the above-described thermal contact position.

Figure 13A:
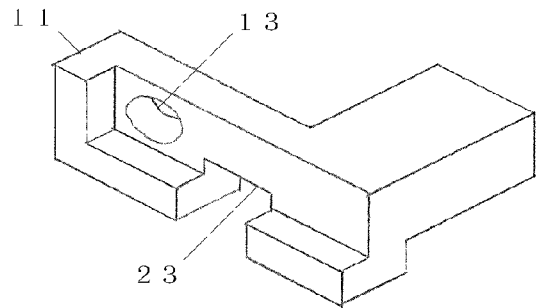
FIGS. 13A to 13C are schematic perspective views of part of a linear light source apparatus according to an embodiment of the present invention.
Figure 13B:
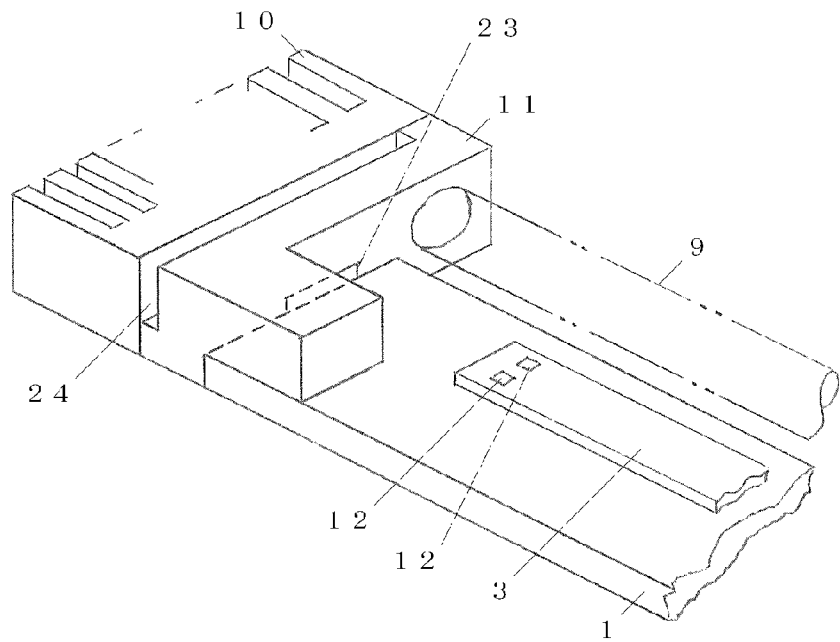

In FIG. 4 or FIG. 9, the electric supply pattern substrate (8) is diverted around the structure of the holding portion (11). Instead of such a configuration, as in FIG. 13 or FIG. 14, a hole can be formed in a thermally conductive frame (1) or a holding portion (11), so that an electric supply pattern substrate (8) may be inserted therein. As shown in FIG. 13A, a cutout portion (23) is provided in a holding portion (11). As shown in FIG. 13B, when a thermally conductive frame (1) is connected with the holding portion (11), the position and size of the cutout portion (23) are determined so that an area of the portion of the cutout portion (23), which is not covered with the thermally conductive frame (1), may exist.

Figure 13C:
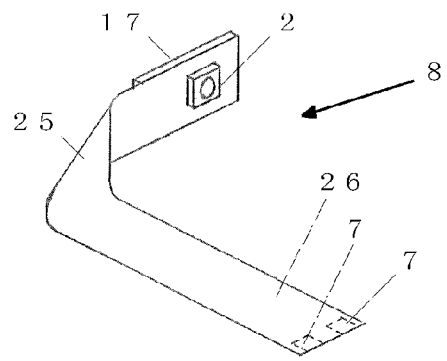

FIG. 13C shows a state where the electric supply pattern substrate (8), which was installed in the structure shown in FIG. 13B, is taken out while the twisted or bent state is maintained. Although the electric supply pattern substrate (8) is gradually twisted in the case of that shown in FIG. 4, in the case of that shown in FIG. 13C, it is twisted at the bent portion (25) of the electric supply pattern substrate (8), and the bent portion (25) is accommodated together with the LED (2) and the auxiliary heat conduction board (17) in a gap (24) between the holding portion (11) and the heat sink (10) as shown in FIG. 13B. And a drive circuit side end (26) of the electric supply pattern substrate (8) is led to an LED drive circuit board (3) through the cutout portion (23) shown in FIG. 13 B, and then the connecting portions (12) of the LED drive circuit board (3) and the connecting portions (7) of the electric supply pattern substrate (8) are connected by, for example, soldering.

Figure 14A:
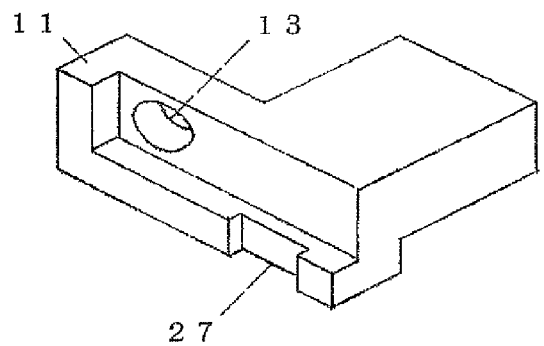
FIGS. 14A to 14C are schematic perspective views of part of a linear light source apparatus according to an embodiment of the present invention.
Figure 14B:
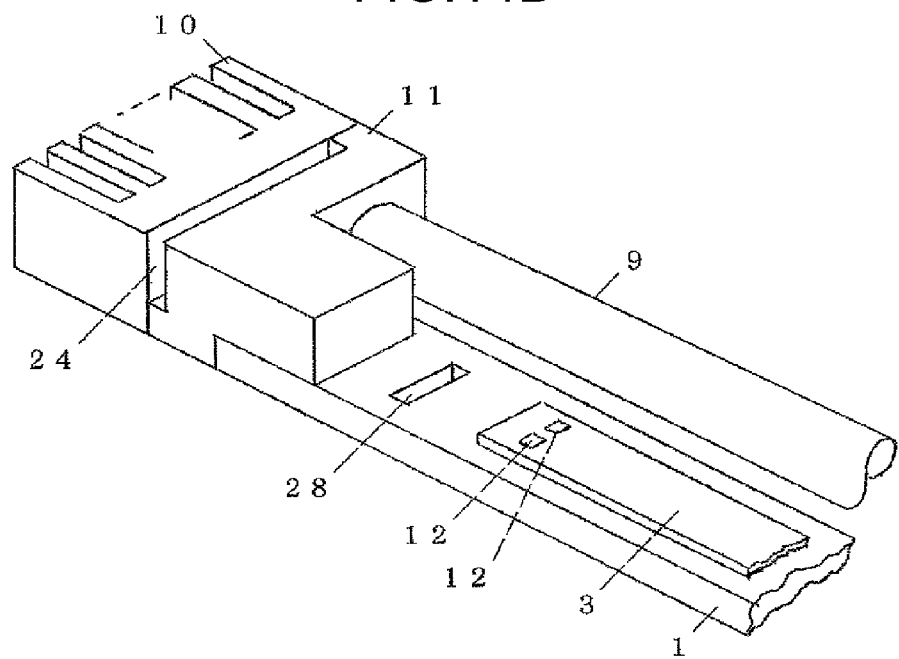
Figure 14C:
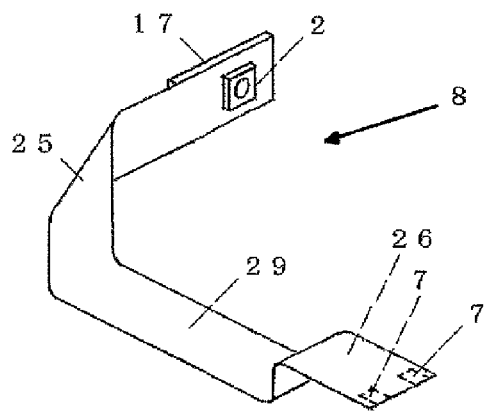

Alternatively, a cutout portion (27) may be provided in a holding portion (11) as shown in FIG. 14A. In addition, as shown in FIG. 14B, a through hole (28) is formed in a thermally conductive frame (1). Similarly to FIG. 13C, FIG. 14C shows a state where an electric supply pattern substrate (8), which was installed in the structure shown in FIG. 14B, is taken out while a twisted or bent state is maintained. The electric supply pattern substrate (8) is led through the through hole (28) so that connecting portions (7) of a drive circuit side end (26) in the electric supply pattern substrate (8) shown in the FIG. 14C and connecting portions (12) of an LED drive circuit board (3), can be connected to each other by, for example, soldering.

However, the bent portion (25) shown in FIG. 13C is accommodated with the LED (2) and the auxiliary heat conduction board (17) in a gap (24) between the holding portion (11) and the heat sink (10). After the electric supply pattern substrate (8) passes under the thermally conductive frame (1) through a cutout portion (27) once, that is, a side opposite to a side of a face where the LED drive circuit board (3) is mounted, it is led out to the upper side of the thermally conductive frame (1) through the through hole (28) and then led to the LED drive circuit board (3). Therefore, in the state where it was attached, an intermediate part (29) of the electric supply pattern substrate (8) is located under the thermally conductive frame (1).

Figure 15:
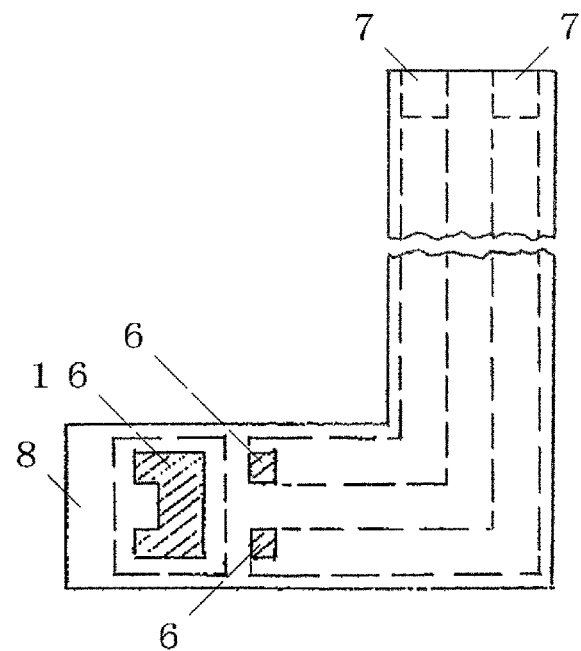
FIG. 15 is a schematic configuration diagram of part of a linear light source apparatus according to an embodiment of the present invention.

In addition, the embodiment on the basis of the linear electric supply pattern substrate (8) as shown in FIGS. 3A to 3D in which the bent portion (25) is provided, is described referring to FIGS. 13A to 13C or FIGS. 14A to 14C. However, the electric supply pattern substrate (8) may be L-shaped as shown in FIG. 15. However, in this case, it is necessary to form the connecting portions (7) of the electric supply pattern substrate (8) on a face of a back side of a face where the connecting portion (6) exists in the electric supply pattern substrate (8).

In addition, although in FIGS. 1, 2, and 4, the holding portion (s) (11) and the thermally conductive frame (1) are separately formed so as to be assembled, they may be integrally formed as one unit. Moreover, although, in the figures, the thermally conductive frame (1), which is square-rod shaped is shown because of the convenience of drawing, the thermally conductive frame (1) may be, for example, L-shaped in a cross section so that the rigidity thereof is raised, or may be in shape in which fins are additionally formed thereon in order to raise the diffusion efficiency of the heat from the thermally conductive frame (1).

In addition, the technology disclosed in Japanese Patent Application Publication No. 2008-275689 may be applied as a method of concretely realizing the light guiding portion material (9). Moreover, the technology disclosed in Japanese Patent Application Publication No. 2008-216409 may be applied to the present invention wherein a reflection mirror is used, and a reading face of an original document is irradiated with light from two directions, so that a linear light source apparatus, which does not produce a shadow, can be realized, even if the original document face has fold lines or stepped parts due to pasting.

The present inventions can be used in the industries in which linear light source apparatuses, which can be used for a document illumination in an optical apparatus, such as a document reading scanner etc., and which may use an LED (light emitting diodes) as a light emitting element, are designed and manufactured.

The preceding description has been presented only to illustrate and describe exemplary embodiments of the present linear light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A linear light source apparatus comprising:
a thermally conductive frame;
an LED;
an LED drive circuit substrate that drives the LED and comprises a substrate face;
a flexible electric supply pattern substrate that comprises an LED mounting face, a connecting face and an electric supply pattern, the electric supply pattern corresponds to an anode or a cathode of the LED wherein an electric power is supplied to the LED from the LED drive circuit substrate via the electric supply pattern, the electronic supply pattern comprises a first connecting portion and a second connection portion, the first connecting portion is located at the LED mounting face and is configured to be connected with the anode or the cathode, the second connecting portion is located at the connecting face and is configured to be connected with a third connecting portion of the LED drive circuit substrate;
a light guide member that propagates a light inputted from the LED;
a holding portion that holds the light guide member and the heat sink that is adjacent to the thermally conductive frame so that heat is conducted into the thermally conductive frame;
wherein an opposite side face of the electric supply pattern substrate that is opposite from the LED mounting face is attached to the heat sink, so that heat generated by the LED is conducted into the heat sink through the electric supply pattern substrate;
wherein the LED drive circuit substrate is arranged along the thermally conductive frame;
wherein a covering face of the heat sink, to which the opposite side face is attached, is perpendicular to a length direction of the light guide member, the LED mounting face is perpendicular to a length direction of the light guide member, and is perpendicular to the substrate face of the LED drive circuit substrate; and
wherein a bent portion is formed in the flexible substrate between the LED mounting face and the connecting face so that the connecting face is parallel to the length direction of the light guide member and is parallel to the substrate face of the LED drive circuit substrate.

2. The linear light source apparatus according to claim 1, wherein the LED mounting face and the connecting face are on the same surface of the electric supply pattern substrate.

3. The linear light source apparatus according to claim 1, wherein the second connecting portion is formed on a side of the electric supply pattern.

4. The linear light source apparatus according to claim 1, wherein an interval of the two electric supply patterns near the second connecting portion is larger than an interval of the two electric supply patterns near the LED.

5. The linear light source apparatus according to claim 1, wherein a path of the electric supply pattern is changed in direction on a way from the first connecting portion to the second connecting portion.

6. The linear light source apparatus according to claim 5, wherein the path is in an L shape.

7. The linear light source apparatus according to claim 1, wherein the third connecting portion comprises an exposed area that does not overlap with the electric supply pattern substrate.

8. The linear light source apparatus according to claim 1, wherein a thermal diffusion slowdown pattern is formed near the second connecting portion or the third connecting portion on an electrical conduction layer.

9. The linear light source apparatus according to claim 1, wherein fine holes are formed on the opposite side face at the second connecting portion.

10. The linear light source apparatus according to claim 1, wherein the LED drive circuit substrate and the thermally conductive frame are thermally in contact with each other, so that the heat generated from a heat generating driver element of the LED drive circuit substrate is conducted into the thermally conductive frame, and wherein a thermal contact position of the heat generating driver element with respect to the thermally conductive frame, is the most distant in a length direction of the thermally conductive frame from a position where a heat flows from the heat sink to the thermally conductive frame.

* * * * *